United States Patent [19]

Iwata et al.

[11] 4,269,155
[45] May 26, 1981

[54] IGNITION TIMING CONTROL SYSTEM FOR INTERNAL COMBUSTION ENGINES

[75] Inventors: Toshiharu Iwata, Aichi; Tadashi Hattori; Siniti Mukainakano, both of Okazaki; Kenji Goto; Daisaku Sawada, both of Susono, all of Japan

[73] Assignees: Nippon Soken, Inc., Nishio; Toyota Jidosha Kogyo Kabushiki Kaisha, Toyota, both of Japan

[21] Appl. No.: 68,477

[22] Filed: Aug. 20, 1979

[30] Foreign Application Priority Data

Sep. 1, 1978 [JP] Japan .................................. 53-107746

[51] Int. Cl.³ .............................................. F02P 5/14
[52] U.S. Cl. .................................................... 123/425
[58] Field of Search ........... 123/117 R, 117 D, 148 E, 123/146.5 A, 148 C, 119 A, 32 EE, 119 D, 32 EK; 73/35

[56] References Cited

U.S. PATENT DOCUMENTS

| 3,969,614 | 7/1976 | Majer et al. | 123/117 D |
|---|---|---|---|
| 4,133,475 | 1/1979 | Harned et al. | 123/117 D |
| 4,169,438 | 10/1979 | Iwase et al. | 123/117 D |
| 4,174,688 | 11/1979 | Hönig et al. | 123/117 D |

OTHER PUBLICATIONS

"Electronic Circuits Manual" p. 262 by Markus copyright 1971.

Primary Examiner—Charles J. Myhre
Assistant Examiner—Raymond A. Nelli
Attorney, Agent, or Firm—Cushman, Darby & Cushman

[57] ABSTRACT

An ignition timing control system for internal combustion engines includes a knock detecting circuit for determining the presence or absence of the knocking in response to a signal from a knock detector, and includes a correction advance computing circuit for computing a correction value of ignition advance thereby to retard the ignition timing by a predetermined angle when the knock is present and to advance the ignition timing when the knock is absent. A further battery is provided to supply electric power to the correction advance computing circuit even after a key switch associated with a main battery for supplying power to the ignition timing control system has been turned off. Hence, the correction advance computing circuit memorizes the computed advance correction value corresponding to a knock condition of the engine just prior to the turn-off of the key switch and the memorized advance correction value is made available in a subsequent operation of the ignition timing control system.

3 Claims, 7 Drawing Figures

IGNITION TIMING CONTROL SYSTEM FOR INTERNAL COMBUSTION ENGINES

BACKGROUND OF THE INVENTION

1. Field of the Invention

The present invention relates to an ignition timing control system for internal combustion engines which serves a function of detecting the occurence of knocking from the vibration, sound or the like produced inside and outside of the cylinders of an engine due to the cylinder pressure so as to retard the ignition timing in response to the occurrence of knock signals.

2. Description of the Prior Art

The ignition timing of an engine must be controlled in accordance with the engine conditions so as to ensure that optimum operation of the engine. Ignition timing control systems known in the art are generally so designed that the ignition timing is controlled in accordance with the engine conditions represented by the engine speed detected by a centrifugal advance mechanism and the intake negative pressure detected by a vacuum advance mechanism.

It is known in the art that generally the best way from the standpoint of engine efficiency and fuel consumption is to effect the ignition at a position near a so-called minimum advance for best torque or MBT, and the ignition timing must be controlled to the MBT in accordance with the engine conditions.

On the other hand, if the ignition timing is advanced gradually under certain engine conditions, eventually knocking will be caused and stable operation of the engine will be made impossible. Generally the relationship between the MBT and amount of ignition spark advance that causes knocking is such that the knocking limit is reached before the MBT under low speed and load conditions. Also the knocking limit is subject to the effects of atmospheric conditions, such as, air temperature and humidity and consequently in accordance with the existing ignition timing control systems the desired spark advance is programmed according to such parameters as the engine speed and intake negative pressure so as to be retarded considerably with respect to the MBT and thereby to prevent the occurrence of knock throughout the range of engine operating conditions. As a result, the power output and fuel consumption of an engine are kept below the rated performance of the engine.

It is well known in the art that there is a close relation between the ignition timing and the cylinder pressure so that when a mixture is exploded, no harmonic component (frequency component usually in the range of 5 to 10 $KH_Z$) will be superimposed on the cylinder pressure when there is no knocking but a harmonic pressure variation will be caused when there is knocking.

This effect results in the generation of vibration or sound outside cylinder. Thus, many different types of so-called knocking feedback ignition systems have been investigated in which such vibration or sound is detected to control the ignition timing.

In accordance with these known systems, the ignition timing is controlled in response to every combustion phenomenon in such a manner that the presence or absence of knocking is detected on every explosion stroke of the respective cylinders and the ignition timing is controlled in accordance with the resulting signal. As for example, the ignition timing is retarded a predetermined angle when there is knocking and the ignition timing is advanced a predetermined angle when it is determined that there is no knocking.

A great disadvantage of applying the feedback in this type of known system is that when the key switch is turned off, the desired amount of spark advance or retard for the ignition timing corresponding to the knock condition will be erased with the result that when the engine is started again, the ignition timing cannot be controlled in consideration of knocking and knocking will be caused.

SUMMARY OF THE INVENTION

With a view to overcoming the foregoing difficulty in the prior art, it is the object of the invention to provide an improved ignition timing control system for internal combustion engines in which the desired amount of spark advance or retard for the ignition timing corresponding to the current knock condition is continuously stored even after the key switch is turned off and consequently the engine can always be operated with the optimum spark advance from the start.

Thus, the present invention has among its great advantages the fact that since the desired amount of spark advance or retard for the ignition timing corresponding to the current knock condition is continuously stored even after the key switch is turned off, when the engine is started again, the desired amount of spark advance or retard corresponding to the previous engine operating condition is readily available and thus the engine can always be operated with the optimum spark advance from the start.

DESCRIPTION OF THE PREFERRED EMBODIMENTS

The present invention will now be described in greater detail with reference to the illustrated embodiments.

Figure 1:
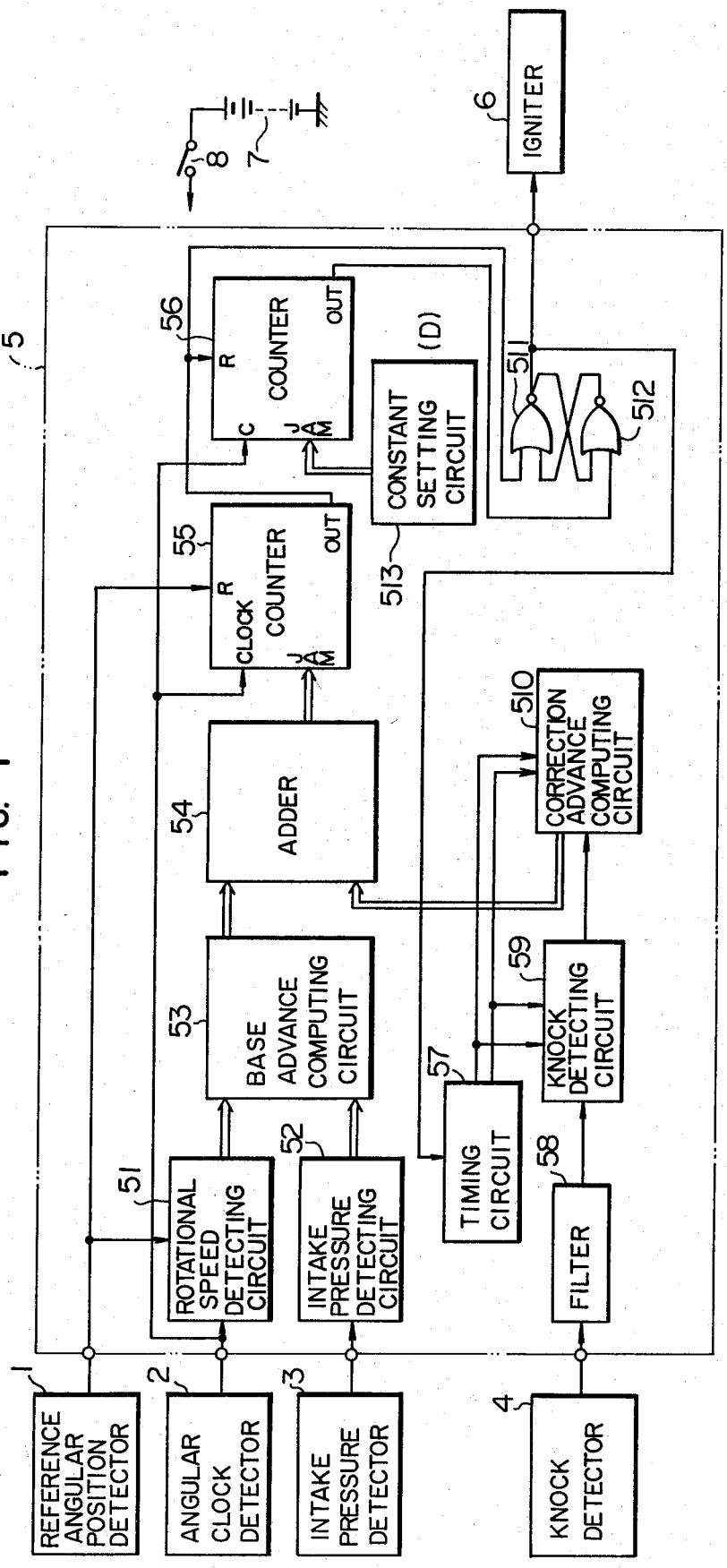
FIG. 1 is a block diagram showing an embodiment of an ignition timing control system according to the invention.

Referring first to FIG. 1 illustrating a block diagram of a first embodiment of the invention, numeral 1 designates a reference angular position detector for generating a crankshaft reference angular position signal T (two signals at equal intervals for every crankshaft revolution in the case of a four-cylinder four-cycle internal combustion engine), 2 an angular clock detector for detecting a position corresponding for example to one degree of crankshaft rotation or 1° crank angle, and 3 an intake pressure detector for detecting the pressure in the engine intake manifold. Numeral 4 designates a knock detector of a piezoelectric element type (piezoelectric element), dynamic type (magnet, coil) or the like which detects vibration of the engine body or vibration sound associated with a knocking phenomenon of the engine. Numeral 5 designates an ignition advance computing circuit connected to the reference angular position detector 1, the angular clock detector 2, the intake pressure detector 3 and the knock detector 4 to control the ignition timing in accordance with the engine conditions. Numeral 6 designates an igniter whereby the output signal of the ignition advance computing circuit 5 is subjected to current amplification to switch on and off the flow of current in the ignition coil which is not shown. Numeral 7 designates a battery, and 8 a key switch whereby the voltage from the battery 7 is applied to various circuits when the key switch 8 is turned on.

The ignition advance computing circuit 5 comprises a rotational speed detecting circuit 51 for detecting the rotational speed of the engine from the output signal of the reference angular position detector 2, an intake pressure detecting circuit 52 for detecting the engine intake pressure from the output signal of the intake pressure detector 3, a base advance computing circuit 53 which receives the rotational speed signal N of the rotational speed detecting circuit 51 and the intake pressure signal P from the intake pressure detecting circuit 52 and comprises a read-only memory (hereinafter referred to as an ROM) into which are programmed the desired advance angles in terms of retard angles from a reference position, a filter 58 comprising for example a bandpass filter or high-pass filter for selecting and transmitting only the knock frequency component from the output of the knock detector 4, a knock detecting circuit 59 for detecting the presence of knock in response to the output of the knock detector 4, a correction advance computing circuit 510 for computing an advance correction value from the knock detection output signals of the knock detection circuit 59, a timing circuit 57 for applying various timing signals to the knock detecting circuit 59 and the correction advance computing circuit 510, and adder 54 for producing the sum of the programmed value from the base advance computing circuit 53 and the correction value from the advance computing circuit 510, counters 55 and 56 each having inputs JAM, a constant setting circuit 513 for determining the desired operation angle D of the ignition coil, and NOR circuits 511 and 512 forming a flip-flop.

Figure 2:
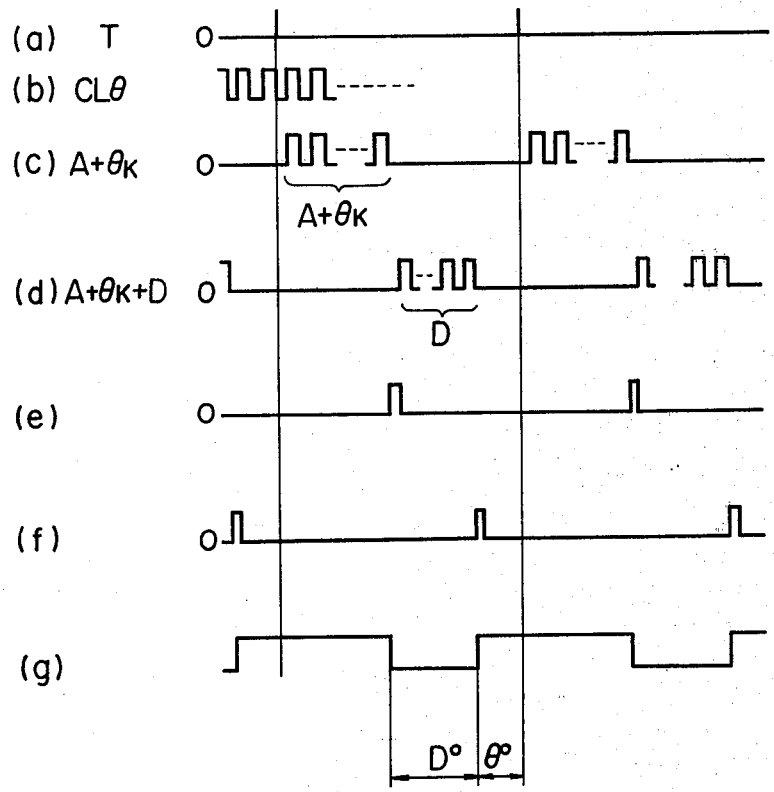
FIG. 2 is a waveform diagram useful for explaining the operation of the system shown in FIG. 1.
Figure 3:
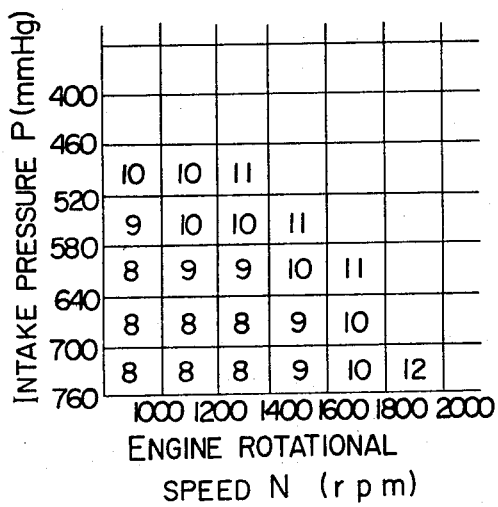
FIGS. 3 and 4 are programmed characteristic diagrams for the system shown in FIG. 1.
Figure 4:
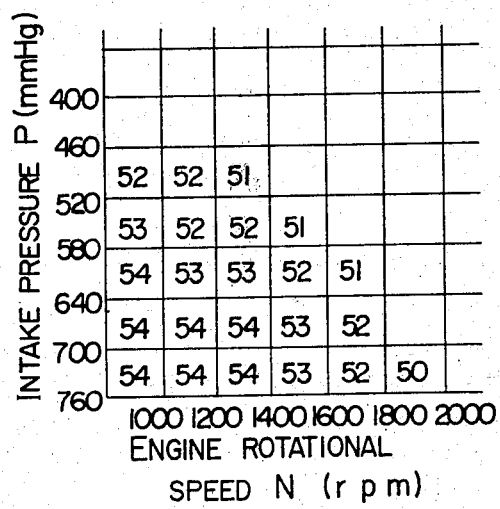

Next, the operation of the first embodiment excluding the timing circuit 57, the filter 48, the knock detecting circuit 59 and the correction advance computing circuit 510 will be described with reference to the time chart of FIG. 2. The reference angular position detector 1 generates the reference signal T (two signals for every crankshaft revolution) shown in (a) of FIG. 2 at the top dead center of each cylinder. The angular clock detector 2 generates the angular signal $CL\theta$ shown in (b) of FIG. 2 for every one degree of crankshaft rotation. The desired advance angles determined according to the values of the rotational speed signal N from the rotational speed detecting circuit 51 and the intake pressure signal P from the intake pressure detecting circuit 52 are stored in terms of retard angles from the reference position in the ROM of the base advance computing circuit 53. In other words, with respect to the reference angle values $\theta$ divided according to the values of the engine speed N and the intake pressure P as shown in FIG. 3, in consideration of the reference position (180° in this case), the correction advance reference amount $\theta_{ko}$ from the correction advance computing circuit 510 (in this case computation is made with $\theta_{ko} = 10°$) and the dwell angle D (e.g., 108°), the values shown in FIG. 4 are stored in the ROM as retard angles A which are given by $A = 180 - \theta - \theta_{ko} - D = 62 - \theta$. For example, it is so programmed that with the intake pressure being in the range 760 to 700 mm Hg, when the rotational speed N is in the range 1200 to 1400 rpm $\theta = 8°$ BTDC and hence $A = 54°$, when in the range 1400 to 1600 rpm $\theta = 9°$ BTDC and hence $A = 53°$, when in the range 1600 to 1800 rpm $\theta = 10°$ BTDC and hence $A = 52°$ and so on, while with the intake pressure being in the range 580 to 520 mm Hg, when the rotational speed N is in the range 1200 to 1400 rpm $\theta = 10°$ BTDC and hence $A = 52°$, when in the range 1400 to 1600 rpm $\theta = 11°$ BTDC and hence $A = 51°$ and so on. In this case, finer the division of the programmed values is, more satisfactory results will be obtained from the standpoint of accuracy but with the corresponding increase in the required capacity of the ROM. In such a case, the required capacity of the ROM can be reduced by connecting the programmed points with a straight line and using the interpolation. For instance, it is only necessary to arrange so that in the previously mentioned case, if the intake pressure is in the range 760 to 700 mmHg, $A = 54°$ is selected for $N = 1200$ rpm and $A = 50°$ for $N = 1800$ rpm and $$A = \frac{50 - 54}{1800 - 1200} \times \Delta N + 54$$

is computed. In this case, $\Delta N$ is the detected rotational speed $N_x - 1200$. The adder 54 produces the sum $(A + \theta_k)$ of the retard angle A from the base advance computing circuit 53 and the correction angle $\theta_k$ from the correction advance computing circuit 510 and the sum is applied to the inputs JAM of the counter 55. The counter 55 is reset by reference angular signal T so that the angular signals $CL\theta$ are counted as shown in (c) of FIG. 2 and its output goes to a "1" level as shown in (e) of FIG. 2 when the count attains the value $(A = \theta_k)$, thus triggering the NOR circuit 511 of the flip-flop and resetting the other counter 56. After the counter 56 has been reset by the output of the counter 55, the counter 56 counts up to the preset number D of the constant setting circuit 513 as shown in (d) of FIG. 2 and thus its output goes to the "1" level as shown in (f) of FIG. 2 when the preset number is attained, thus triggering the NOR circuit 512 of the flip-flop. The output of the NOR circuit 511 changes as shown in (g) of FIG. 2 and it is coupled to the igniter 6. Consequently, the time that the output of the counter 56 to the "1" level corresponds to the desired ignition timing, the time that the output of the counter 55 goes to the "1" level corresponds to the time of starting the primary current flow and the dwell angle corresponds to the preset value D°.

Figure 5:
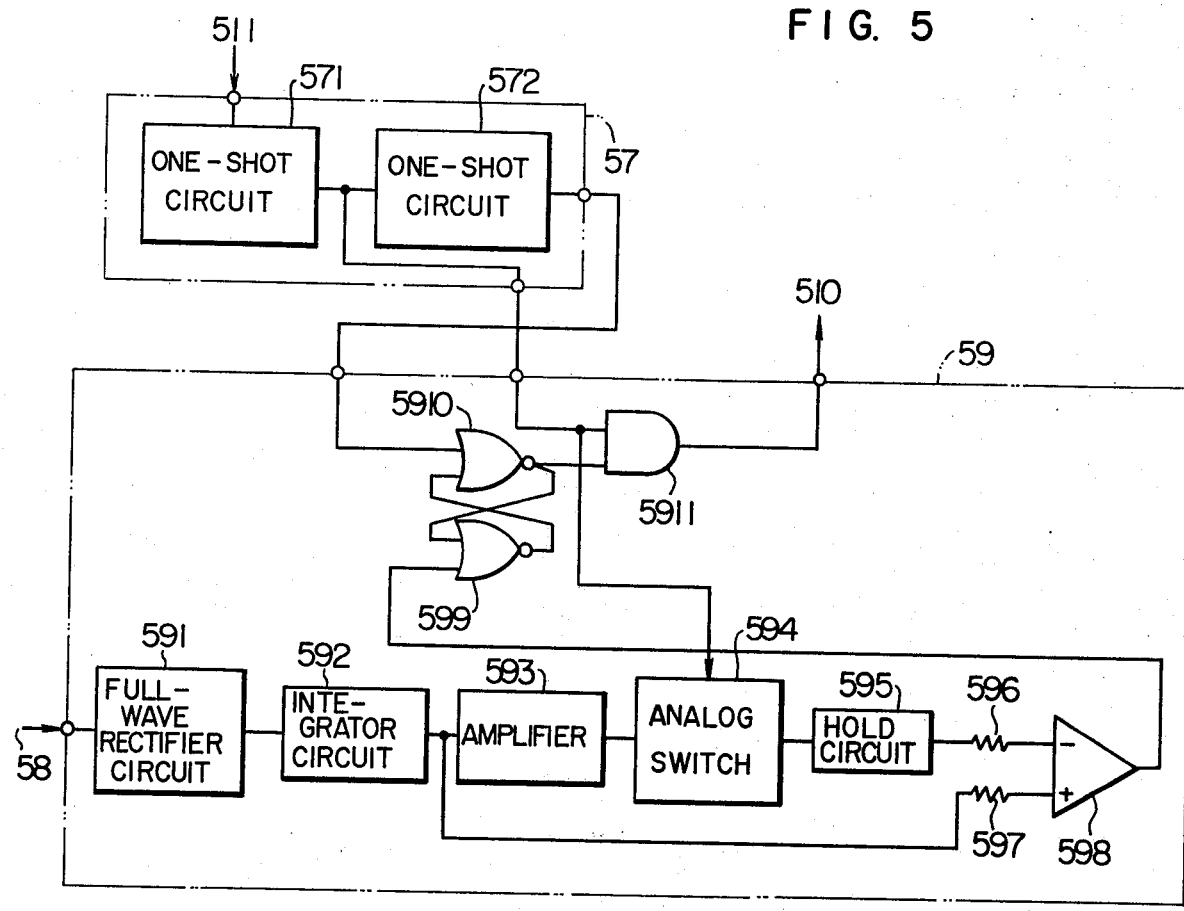
FIGS. 5 and 6 are detailed circuit diagrams for the principal parts of the system shown in FIG. 1.

Next, the detection of knock by means of the timing circuit 57, the filter 58 and the knock detecting circuit 59 will be described. Referring to FIG. 5, the timing circuit 57 receives the output signal of the NOR circuit 511 connected to the igniter 6 and it comprises one-shot circuits 571 and 572. The output of the one-shot circuit 571 goes to the "1" level as shown in (a) of FIG. 7 in response to the ignition discharge thereby producing a pulse signal of a time width $\tau_1$, and the output of the one-shot circuit 572 goes to the "1" level as shown in (b) of FIG. 7 in response to the negative-going transition of the pulse signal $\tau_1$ from the one-shot circuit 571 thereby producing a pulse signal having a time width $\tau_2$. The outputs of the one-shot circuits 571 and 572 are coupled to the knock detecting circuit 59. The knock detecting circuit 59 receives, in addition to the timing signals, the vibration waveform applied from the knock detector 4 through the filter 58 and falling within a predetermined bandwidth (5 to 10 KHz in this embodiment). In FIG. 5 the knock detecting circuit 59 comprises a full-wave rectifier circuit 591, an integrator circuit 592, an amplifier 593, an analog switch 594, a hold circuit 595 including a resistor and a capacitor, input resistors 596 and 597, a comparator circuit 598, NOR circuits 599 and 5910 and an AND circuit 5911. The vibration input is full-wave rectified by the full-wave rectifier circuit 591 and smoothed by the integrator circuit 592 comprising a parallel combination of a capacitor and a resistor, thus generating the average value of the vibration input and coupling the same to the amplifier 593 and the resistor 597. The input is amplified K times by the amplifier 593 and it is then applied to the hold circuit 595 through the analog switch 594 which is turned on during the time $\tau_1$. Consequently, the output of the hold circuit 595 represents the average vibration input during the time $\tau_1$ immediately following each ignition. This output is applied to one input of the comparator circuit 598 through the resistor 596 and the output of the integrator circuit 592 is directly applied to the other input of the comparator circuit 598 through the resistor 597. In this case, the vibration input memorized during the time $\tau_1$ represents the average value of the base vibration containing a noise signal and it is increased by K times for comparison in amplitude with the direct integrator output signal. During the time immediately following each ignition no knocking phenomenon takes place until the formation of a flame core, and consequently by selecting the time width $\tau_1$ equal to the time required for the formation of a flame core (usually less than 1 msec after each ignition), it is possible to detect the base vibration. Thus, when the combustion proceeds so that knock occurs and the vibration increases, this increased vibration is compared in magnitude with the base vibration to determine whether there is knocking. Generally, the base vibration increases with an increase in the engine rotational speed and it also varies with the intake pressure. Thus, by using the method of this invention, it is possible to detect the base vibration in a wider range of engine conditions. As a result, when knock occurs, the output of the integrator circuit 592 becomes greater than the base vibration which was increased by K times so that the output of the comparator circuit 598 goes to the "1" level and this "1" level output is applied to one of the NOR circuits 599 and 5910 forming the flip-flop, thus causing the output of the NOR circuit 5910 to go to the "1" level. This "1" level output is applied to the AND circuit 5911 and it is gated along with the pulse of the time width $\tau_1$, thus generating at the output a pulse of the time width $\tau_1$.

Figure 6:
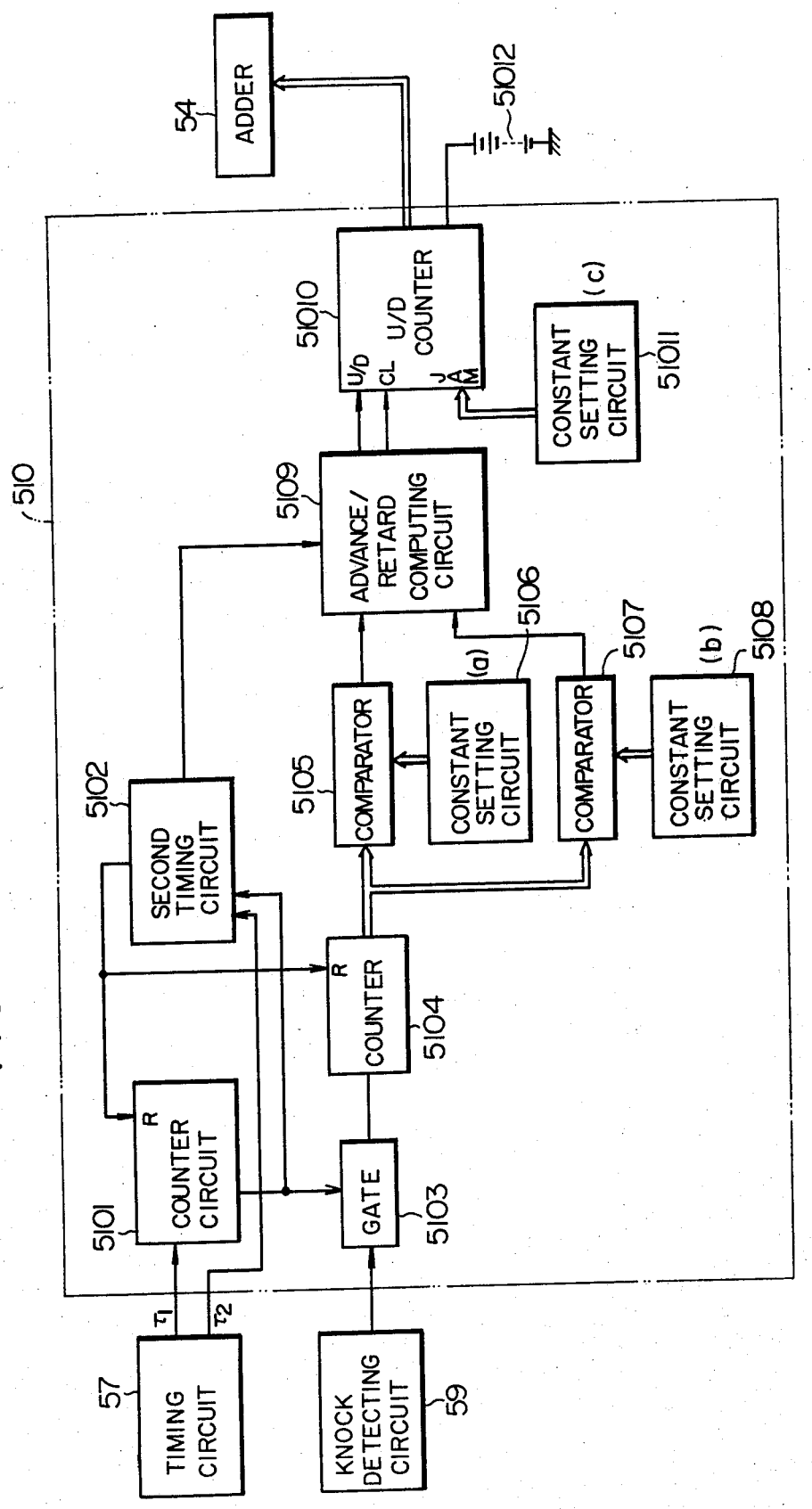

Referring now to FIG. 6, the correction advance computing circuit 510 will be described. The correction advance computing circuit 510 comprises a scale of m+1 ring counter circuit 5101 whereby the pulses of $\tau_1$ from the timing circuit 57 are counted and its output goes to the "1" level when the count attains the preset number m+1, a second timing circuit 5102 for receiving the output of the counter circuit 5101 and the pulses of $\tau_2$ from the timing circuit 57 to apply a timing signal to an advance/retard discrimination circuit 5109 and a reset signal to the counter circuit 5101 and a counter 5104, a gate 5103 for passing the output of the knock detecting circuit 59 only when the output of the counter circuit 5101 is at "0", the counter 5104 for counting the knock signals passed through the gate 5104 to generate the resulting count number n, a comparator 5105 for comparing the output n of the counter 5104 with the preset number a of a constant setting circuit 5106 to generate "1" level output when n≧a and generate a "0" level output when n<a, a comparator 5107 for comparing the output n of the counter 5104 with the preset number b of a constant setting circuit 5108 to generate a "1" level output when n≧b and generate a "0" level output when n<b (where a≧b), the advance/retard discrimination circuit 5109 for receiving the timing signal from the second timing circuit 5102, the output signal of the comparator 5105 and the output signal of the comparator 5107 to generate an up/down signal (U/D) and a clock signal (CL), an up/down (U/D) counter 51010 for receiving the up/down signal (U/D) and the clock signals (CL) from the advance/retard discrimination circuit 5109 and the preset number c of a constant setting circuit 51011 to successively count up or count down the clock signals (CL) from the preset number c and thereby to generate the current count number, and a battery 51012 for always applying a voltage to the U/D counter 51010.

Figure 7:
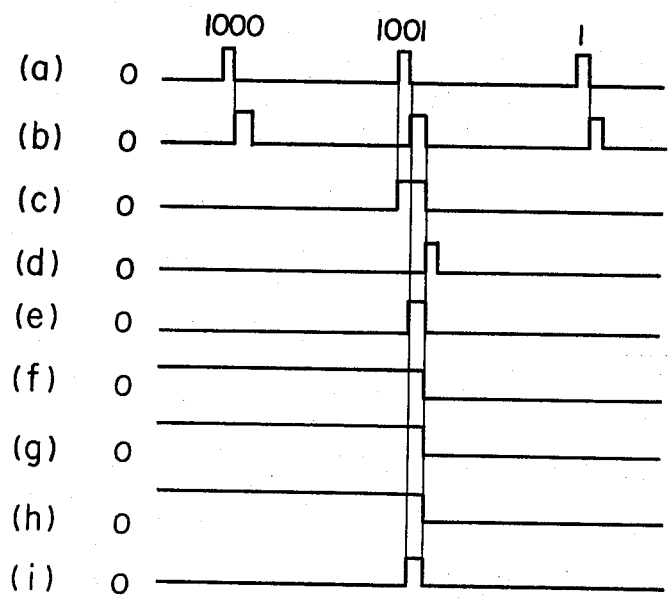
FIG. 7 is a waveform diagram useful in explaining the operation of the circuits shown in FIGS. 5 and 6.

Next, the operation of the advance/retard discrimination circuit 510 will be described with reference to the time chart of FIG. 7. The counter circuit 5101 determines a predetermined number of times of sampling m. While the number of times m may be in the range of several tens to several ten thousands or over, assuming for the purpose of description that it is set to 1000, the preset number of the counter circuit 5101 is selected "1001" so that the pulses of $\tau_1$ shown in (a) of FIG. 7 are counted and the output of the counter circuit 5101 goes to the "1" level as shown in (Ic) of FIG. 7 in response to the positive-going transition of the 1001st pulse. When this occurs, the gate 5103 is closed and by this time as many knock signals as the number of occurrences of knock n during the 1000 times of sampling have been counted by the counter 5104. When the number n is n≧a≧b, the comparators 5105 and 5107 respectively generate "1" level output as shown in (f) and (g) of FIG. 7 and consequently the advance/retard discrimination circuit 5107 generates the "1" level up signal shown in (h) of FIG. 7 and the clock signal (CL) shown in (i) of FIG. 7 or the timing signal generated from the second timing circuit 5102 as shown in (e) of FIG. 7 in synchronism with the 1001st pulse of $\tau_2$. The U/D counter 51010 receives the up signal and the clock signal so that the count is increased by 1 and the resulting count number is applied as the correction angle $\theta_k$ to the adder 54. Consequently, the data applied to the inputs JAM of the counter 55 is increased by 1 and the counter 55 counts out later by 1 than previously, thus retarding the ignition timing by 1° crank angle. When the number of occurrences of knock n is a >n≧b, the comparator 5105 generates a "0" level output and the comparator 5107 generates a "1" level output. In this case, the advance/retard discrimination circuit 5109 generates a "0" level down signal and the clock signal remains at the "0" level generating no pulse. As a result, the U/D counter 51010 does not change the count and the previous count number is applied to the adder 54, thus causing the advance angle to remain unchanged. When the number of occurrences of knock n becomes a≧b>n, each of the comparators 5105 and 5107 generates a "0" level output. When this occurs, the advance/retard discrimination circuit 5109 generates a "0" level down signal and the same clock signal as shown in (i) of FIG. 7. Consequently, the U/D counter 51010 decreases the count by 1. As a result, the data applied to the inputs JAM of the counter 55 is decreased by 1 and the counter 55 counts out earlier by 1 than previously, thus advancing the ignition timing by 1° crank angle. The reset signal from the second timing circuit 5102 is a short pulse which goes to the "1" level in response to the negative-going transition of the 1001st pulse of $\tau_2$ as shown in (d) of FIG. 7 and the reset signal resets the counter circuit 5101 and the counter 5104, thus starting the next 1000 times of sampling.

When the first 1000 times of sampling resulted in $n \geq a \geq b$ thus retarding the ignition timing by 1° and the next 1000 times of sampling results in the same $n \geq a \geq b$, the count number of the U/D counter 51010 is increased by 2 over the initial value and the ignition timing is retarded by 2° crank angle. In this way, the count number of the U/D counter 51010 is suitably increased or decreased and the amount of spark advance is adjusted to bring the number of occurrences of knock n into the predetermined range of $a > n \geq b$.

The preset numbers a and b should each preferably be on the order of several % of the number of times of sampling, and by determining the preset numbers as $a=50$ and $b=20$ for 1000 times of sampling, it is possible to always effect the feedback control to ensure a trace knock condition where the occurrences of knock will be in the range of 2 to 5% on an average.

Further, since the voltage is always applied to the U/D counter 51010 from the battery 51012, even after the key switch 8 is turned off, the U/D counter 51010 holds the count number, and consequently when the key switch 8 is again turned on so that the voltage is applied form the battery 7 to the individual circuits and the engine comes into operation, the U/D counter 51010 varies the count value carried over from the previous engine operation.

While, in the embodiment described above, the battery 51012 is provided in addition to the battery 7 so as to always apply the supply voltage to the U/D counter 51010, it is possible to arrange so that the output of the battery 7 is regulated at a predetermined value by a voltage regulator circuit which is not shown and the resulting supply voltage is always applied to the U/D counter 51010 from the voltage regulator circuit.

Still further, while, in the above-described embodiment, the knock detector 4 is designed to detect the engine vibration, the same effect may be obtained by detecting knocking sound with a microphone. Also the vibration sensor may be any one of various types including the acceleration type, speed type, position displacement type, etc.

Still further, while, in FIG. 6, the voltage of the battery 51012 is applied to the U/D counter 51010 alone, it is possible to always apply the voltage of the battery 51012 to the counter circuit 5101 and the counter 5104 so that the data obtained in the course of each sampling cycle may be maintained until the next engine operation, and this is particularly effective in cases where a greater number of times of sampling is required.

We claim:

1. An ignition timing control system for an internal combustion engine comprising:
   a knock detector for sensing vibrations of said engine;
   a knock detecting circuit for comparing an output signal of said knock detector with a predetermined threshold level and for generating a knock detection signal indicating when said output signal is above said predetermined threshold level;
   correction advance computing means, responsive to said knock detection signal, for computing an advance correction angle and generating an ignition advance correcting signal related thereto, said advance computing means comprising:
   counter means for counting said knock detection signal to determine the number n of knocks occurring within a predetermined number of engine ignitions; and
   comparator and computing means for (i) comparing the counted number n with upper and lower limits (a) and (b), respectively; (ii) producing said ignition advance correcting signal effective to retard ignition timing when $n \geq a$; (iii) producing said ignition advance correcting signal effective to not alter ignition timing when $b < n < a$; and (iv) producing said ignition advance correcting signal effective to advance ignition timing when $n \leq b$;
   ignition timing signal generating means for generating an ignition timing signal as corrected with said advance correction angle thereby to retard or advance the timing of ignition of said engine depending on the amount of knock; and
   means for supplying electric power to said correction advance computing means even after a key switch associated with said engine is turned off, thereby to maintain said correction advance computing means being to maintain said correction advance computing means being energized to memorize said advance correction angle corresponding to a knock condition just before the key switch is turned off.

2. An ignition timing control system according to claim 1, wherein said correction advance computing means includes an up/down counter for counting up or down a preset number depending on whether an output signal of said knock detection circuit indicates the presence or absence of the knock, said up/down counter providing a count number representative of said advance correction angle; and wherein said means for supplying electric power is a battery connected to said up/down counter.

3. An ignition timing control system according to claim 1 further comprising:
   a base advance computing circuit including a read only memory (ROM) storing a matrix of basic advance angles corresponding to combinations of engine rotational speed and intake manifold pressure, said advance correction angles from said correction advance computing means being combined with said basic advance angles from said ROM to determine ignition timing.

* * * * *